(12) United States Patent
Shin et al.

(10) Patent No.: US 11,383,579 B2
(45) Date of Patent: Jul. 12, 2022

(54) AIR CONDITIONING SYSTEM FOR VEHICLE AND CONTROL METHOD THEREOF

(71) Applicants: Hyundai Motor Company, Seoul (KR); Kia Motors Corporation, Seoul (KR); Hanon Systems, Daejeon (KR)

(72) Inventors: Gee Young Shin, Suwon-si (KR); Dong Ho Kwon, Yongin-si (KR); Dae Ig Jung, Suwon-si (KR); Seung Hyeok Chang, Suwon-si (KR); Jeong Hoon Lee, Daejeon (KR); Joong Jae Kim, Daejeon (KR)

(73) Assignees: Hyundai Motor Company, Seoul (KR); Kia Motors Corporation, Seoul (KR); Hanon Systems, Daejeon (KR)

( * ) Notice: Subject to any disclaimer, the term of this patent is extended or adjusted under 35 U.S.C. 154(b) by 678 days.

(21) Appl. No.: 16/435,788

(22) Filed: Jun. 10, 2019

(65) Prior Publication Data

US 2020/0189355 A1 Jun. 18, 2020

(30) Foreign Application Priority Data

Dec. 14, 2018 (KR) .................... 10-2018-0161964

(51) Int. Cl.
*B60H 1/00* (2006.01)
*G06F 1/20* (2006.01)

(52) U.S. Cl.
CPC ....... *B60H 1/00792* (2013.01); *B60H 1/0073* (2019.05); *B60H 1/00771* (2013.01);
(Continued)

(58) Field of Classification Search
CPC ............. B60H 1/00792; B60H 1/0073; B60H 1/00771; B60H 1/00849; B60H 1/00878;
(Continued)

(56) References Cited

U.S. PATENT DOCUMENTS

| 10,166,838 B2 * | 1/2019 | Inaba ................. B60H 1/00485 |
| 2008/0053128 A1 * | 3/2008 | Takeda ............... B60H 1/00821 62/244 |

(Continued)

FOREIGN PATENT DOCUMENTS

KR 10 1999-0016821 A 3/1999

*Primary Examiner* — Marc E Norman
(74) *Attorney, Agent, or Firm* — Morgan, Lewis & Bockius LLP

(57) ABSTRACT

An air conditioning system for a vehicle and a control method thereof may include a temperature detector; an air conditioning actuator including a cooling device and a blower; and a controller connected to the temperature detector and the air conditioning actuator and including: a load determination portion determining an air conditioning load based on factors including an internal temperature or an external temperature of a vehicle detected by the temperature detector; a storage portion storing a control map that controls the air conditioning actuator according to the air conditioning load; and an update portion updating a control value, pre-stored in the control map, of the air conditioning actuator for the air conditioning load to a demand value of a user when receiving the demand value of the user for the air conditioning actuator.

15 Claims, 11 Drawing Sheets

(52) U.S. Cl.
CPC ..... *B60H 1/00849* (2013.01); *B60H 1/00878* (2013.01); *B60H 1/00964* (2013.01); *G06F 1/206* (2013.01); *B60H 2001/0015* (2013.01)

(58) Field of Classification Search
CPC ........ B60H 1/00964; B60H 2001/0015; G06F 1/206
See application file for complete search history.

(56) References Cited

U.S. PATENT DOCUMENTS

| | | | | |
|---|---|---|---|---|
| 2012/0291467 A1* | 11/2012 | Sasaki | ................... | F25B 49/022 62/151 |
| 2019/0184789 A1* | 6/2019 | Aizawa | .............. | B60H 1/00878 |

* cited by examiner

AIR CONDITIONING SYSTEM FOR VEHICLE AND CONTROL METHOD THEREOF

CROSS REFERENCE TO RELATED APPLICATION

The present application claims priority to Korean Patent Application No. 10-2018-0161964, filed Dec. 14, 2018, the entire contents of which is incorporated herein for all purposes by this reference.

BACKGROUND OF THE INVENTION

Field of the Invention

The present invention relates to an air conditioning system for a vehicle and a control method thereof, wherein user manipulation of the air conditioning system received on the basis of calories or other required conditions necessary for air conditioning of a vehicle is learned, and a learning result is applied to a control map of the air conditioning system to provide customized air conditioning control.

Description of Related Art

Generally, an auto mode function is provided in an air conditioning system. When a user inputs a set temperature, a compressor, valves, a blower, and a mode door are controlled in the auto mode to bring an internal temperature of a vehicle into agreement with the set temperature. The parts of an air conditioning actuator are controlled by a pre-stored data map.

However, since the internal temperature is controlled automatically in the auto mode by using the set temperature and the data map predetermined by surrounding environment variables, it is impossible to customize the internal temperature.

Even when different users set the same temperature of 23° C., some users may desire the temperature to be reached rapidly by increasing a wind amount, while other users may desire the temperature to be reached slowly by using a small amount of wind.

Accordingly, in the auto mode of the related art, the air conditioning actuator is automatically controlled, but it is impossible to provide a customized air conditioning control, and accordingly, needs and preferences of consumers are not reflected sufficiently.

The foregoing is intended merely to aid in the understanding of the background of the present invention, and is not intended to mean that the present invention falls within the purview of the related art which is already known to those skilled in the art.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an air conditioning system for a vehicle and a control method thereof, wherein user manipulation of the air conditioning system received on the basis of calories or other required conditions necessary for air conditioning of a vehicle is learned, and a learning result is applied to a control map of the air conditioning system to provide a customized air conditioning control.

In various aspects of the present invention, there is provided an air conditioning system for a vehicle, the air conditioning system including: a temperature detector; an air conditioning actuator including a cooling device and a blower; and a controller connected to the temperature detector and the air conditioning actuator and including: a load determination portion determining an air conditioning load based on factors including an internal temperature or an external temperature of a vehicle detected by the temperature detector; a storage portion storing a control map that controls the air conditioning actuator according to the air conditioning load; and an update portion updating a control value, pre-stored in the control map, of the air conditioning actuator for the air conditioning load to a demand value of a user when receiving the demand value of the user for the air conditioning actuator.

The temperature detector may detect the internal temperature and the external temperature of the vehicle, and the load determination portion may determine the air conditioning load based on the internal temperature and the external temperature of the vehicle.

The air conditioning load may be a caloric index, and the load determination portion may determine the caloric index by use of difference between a predetermined temperature value input by the user and a predetermined reference value, difference between the predetermined temperature value and an internal temperature value, external temperature value, and solar radiation amount level.

The control map of the storage portion may be data map, to which the air conditioning load is input and from which blower wind quantity and whether to operate the cooling device are output.

The air conditioning actuator may further include a mode door controlling an internal discharging direction of air.

When receiving a demand value of a user for a specific portion of the air conditioning actuator, the update portion may update a control value for an air conditioning load of control values for the specific portion pre-stored in the control map to the demand value of the user.

When the demand value of the user for the specific portion is higher than the control value at the receiving time of the demand value, the update portion may update the control values belonging to an air conditioning load section before or after the air conditioning load at the receiving time such that the control values are increased to the demand value of the user.

When the demand value of the user for the specific portion is lower than the control value at the receiving time of the demand value, the update portion may update the control values belonging to an air conditioning load section before or after the air conditioning load at the receiving time such that the control values are decreased to the demand value of the user.

The load determination portion may determine the air conditioning load based on the external temperature of the vehicle.

The storage portion may store a predetermined temperature map, to which the air conditioning load is input and from which the predetermined temperature value is output, and the update portion may update the predetermined temperature value for the air conditioning load pre-stored in the control map to a predetermined temperature demand value of a user when receiving the predetermined temperature demand value of the user.

The storage portion may store a cooling device control map, to which the air conditioning load is input and from which a cooling device control value is output, and the update portion may update the cooling device control value for the air conditioning load pre-stored in the control map to a cooling device demand value of a user when receiving the cooling device demand value of the user.

A control method of the air conditioning system of the present invention may include: determining the air conditioning load, by the load determination portion, based on the factors including the internal temperature or the external temperature of the vehicle detected by the temperature detector; receiving the demand value of the user, by the controller, for the air conditioning actuator; and updating, by the controller, the control value of the air conditioning actuator for the air conditioning load pre-stored in the control map to the demand value of the user.

According to the air conditioning system for a vehicle and the control method of the present invention, user manipulation of the air conditioning system received on the basis of calories or other required conditions necessary for air conditioning of a vehicle is learned, and a learning result is applied to the control map of the air conditioning system to provide a customized air conditioning control.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
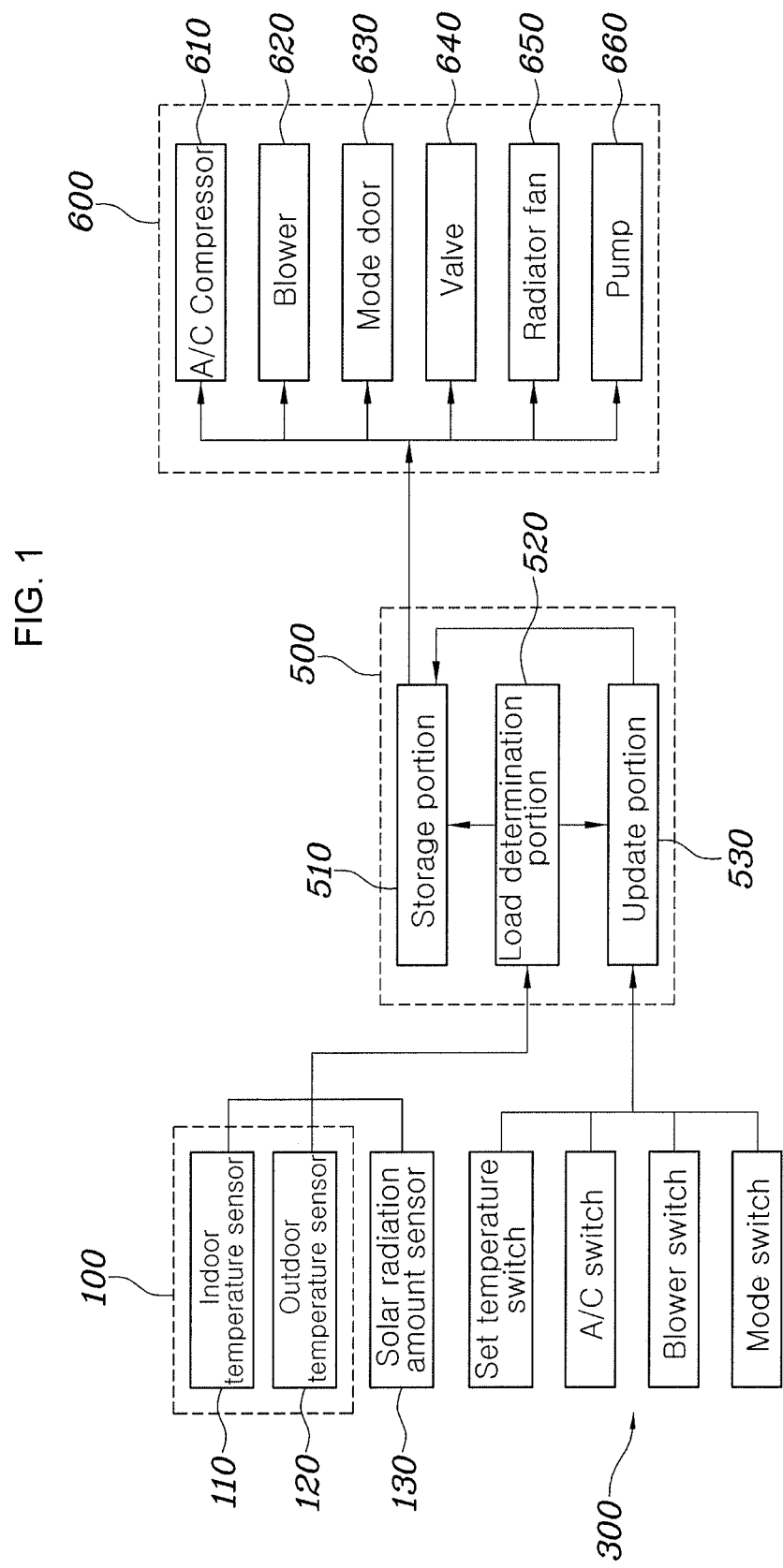
FIG. 1 is a block diagram of an air conditioning system for a vehicle according to an exemplary embodiment of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Figure 2:
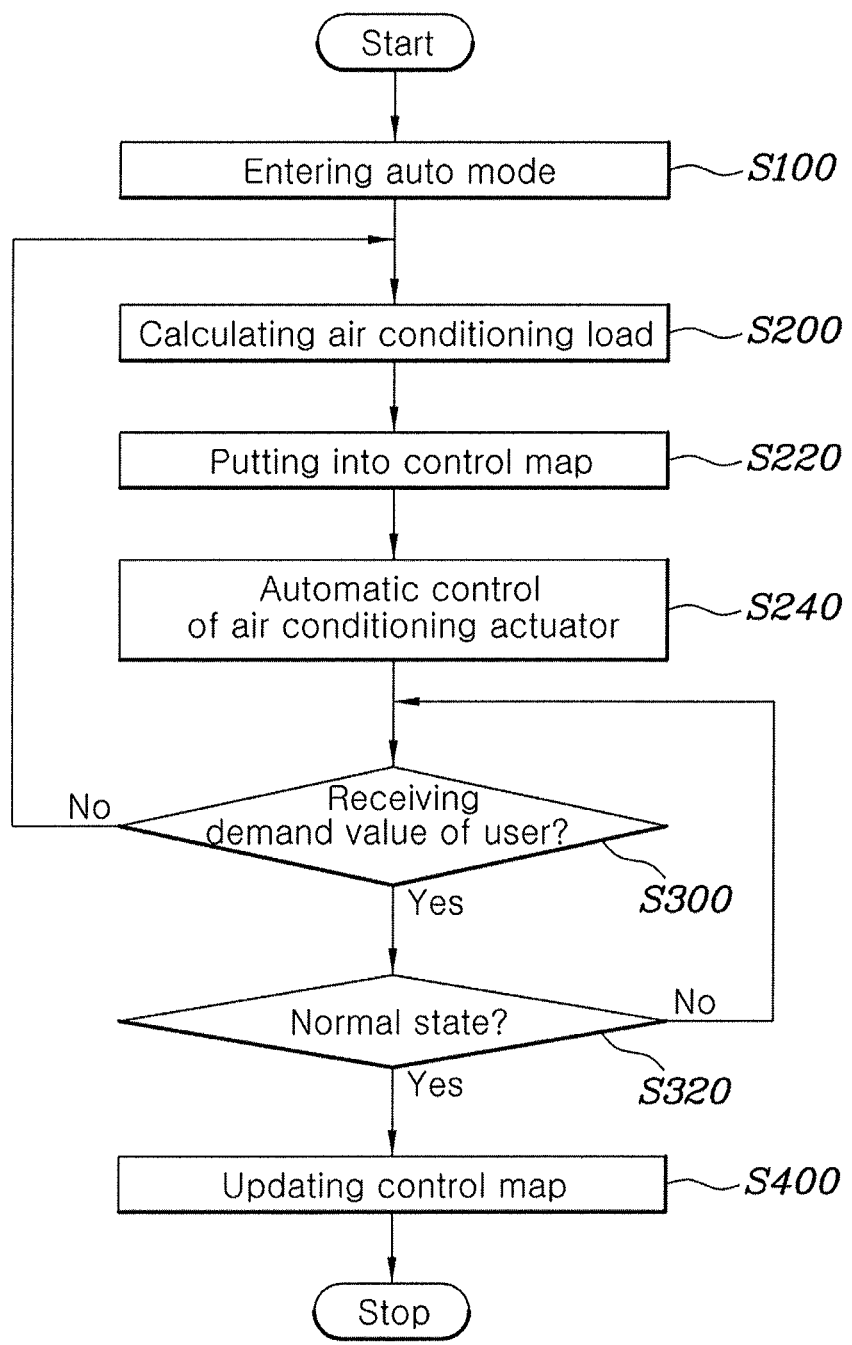
FIG. 2 is a flowchart of a control method of the air conditioning system for a vehicle according to the exemplary embodiment of the present invention.

FIG. 1 is a block diagram of an air conditioning system for a vehicle according to an exemplary embodiment of the present invention; FIG. 2 is a flowchart of a control method of the air conditioning system for a vehicle according to the exemplary embodiment of the present invention; and FIG. 3, FIG. 4, FIG. 5, FIG. 6, FIG. 7, FIG. 8, FIG. 9, FIG. 10 and FIG. 11 are graphs illustrating a process of updating a control map of the air conditioning system for a vehicle according to the exemplary embodiment of the present invention.

As shown in FIG. 1, the air conditioning system for a vehicle according to an exemplary embodiment of the present invention may include a temperature detector 100; an air conditioning actuator 600 including a cooling device and a blower; and a controller 500 including: a load determination portion 520 determining an air conditioning load based on factors including an internal temperature or an external temperature of a vehicle detected by the temperature detector 100; a storage portion 510 storing a control map that controls the air conditioning actuator according to the air conditioning load; and an update portion 530 updating a control value, pre-stored in the control map, of the air conditioning actuator for the air conditioning load to a demand value of a user when receiving the demand value of the user for the air conditioning actuator 600.

The present invention is directed to customizably provide an auto mode control of an air conditioning system for a vehicle in the related art. To the present end, the controller of the air conditioning system, which includes the control map as generally, controls the air conditioning actuator according to the control map, and when there is the demand value of a user, updates the control map according to the demand of the user. When the air conditioning actuator is controlled in the same condition hereafter, the controller controls the air conditioning actuator based on an updated control map to realize a customized auto mode.

To the present end, the air conditioning system of the present invention includes the temperature detector 100. The temperature detector 100 detects the internal temperature and the external temperature of a vehicle. To the present end, temperature sensors 110 and 120 measuring the internal temperature and the external temperature, respectively, may be provided in a cabin and an engine compartment of the vehicle. Alternatively, the temperatures may be indirectly determined by use of other data of the vehicle instead of directly measuring the temperatures by use of the temperature sensor. Whether any one of the above-described methods is used, an internal temperature value and an external temperature value of a vehicle are obtained. Furthermore, an additional solar radiation amount sensor 130 may be provided for obtaining a precise air conditioning load.

Furthermore, the load determination portion 520 of the controller 500 determines the air conditioning load based on the internal temperature or the external temperature of a vehicle detected by the temperature detector 100. Furthermore, the controller 500 obtains the control value of the air conditioning actuator by putting a determined air conditioning load into the storage portion 510, and controls various parts of the air conditioning actuator 600 by use of an obtained control value. The air conditioning actuator 600 includes parts such as the blower 620 and the cooling device including an air conditioning (A/C) compressor 610, a mode door 630, a valve 640, a radiator fan 650, and a pump 660.

The air conditioning load, which is presented as a numerical value of 0 to 225, is a caloric index, which is a dimensionless value. When the caloric index is 0, maximum cooling is required, and when the caloric index is 225, maximum heating is required. That is, the caloric index may be used as the air conditioning load, and the caloric index of a vehicle may refer to a measure of calorie necessary for internal air conditioning.

The load determination portion 520 of the controller may be configured to determine the air conditioning load based on the internal temperature and the external temperature of a vehicle. The air conditioning load is a caloric index, and the load determination portion 520 may determine the caloric index by use of difference between a predetermined temperature value input by the user and a predetermined reference value such as 23° C., difference between the predetermined temperature value and an internal temperature value, external temperature value, and solar radiation amount level. The load determination portion 520 determines the caloric index as the following equation.

$$Td = \text{Offset} + K1 \times (Tset - Tref) + K2 \times (Tset - Tin) + K3 - K4$$

Td: caloric index
Offset: Default value
K1: Set gain
Tset: predetermined temperature value
Tref: predetermined reference value,
Tin: Inflow air temperature value
K2: a gain of internal temperature
K3: a gain of external temperature
K4: a gain of solar radiation amount That is, as presented above, the load determination portion 520 determines the caloric index according to the predetermined equation by use of the predetermined temperature value, the internal temperature value, the external temperature value, and a solar radiation amount value set through an auto mode by a user. Furthermore, the controller 500 obtains the control value of each of the parts of the air conditioning actuator 600 of a vehicle by putting the determined caloric index, which is a dimensionless number, into the storage portion, and controls each of the parts according to the obtained control value, whereby the air conditioning system is controlled to meet the predetermined temperature value.

Meanwhile, even in the auto mode, a user may perform manually such manipulations as changing a predetermined temperature, increasing blower wind quantity, stopping the compressor, or changing. In the instant case, although the air conditioning system is basically controlled in the auto mode, need of each of users is not met precisely, and thus most of the users re-input air-conditioning control values as the users desire in the auto mode. To minimize the present problem, the present invention is configured to allow a data map stored in the storage portion to be learned in a customized way. Examples of a switch 300 which may be manually input by a user may include a predetermined temperature switch, a refrigerant compressor switch, a blower switch, and a mode conversion switch.

For the learning, in the auto mode, the update portion 530 receives the demand value of a user from the switch 300 for the air conditioning actuator 600. Furthermore, the update portion is configured to update the control value of the air conditioning actuator for the air conditioning load pre-stored in the control map to the demand value of the user.

The control map of the storage portion 510 may be a data map, to which the air conditioning load is input and from which blower wind quantity and whether to operate the cooling device are output. Furthermore, the air conditioning actuator 600 may further include a mode door controlling an internal discharging direction of air, and the control map may output a control value of the mode door.

When receiving a demand value of a user for a specific portion of the air conditioning actuator 600, the update portion 530 may update a control value for an air conditioning load of control values for the specific portion pre-stored in the control map to the demand value of the user. That is, even in the air conditioning system set in the auto mode, when a user demands blower wind quantity by manually controlling the blower wind quantity, the data map on the control map is modified to bring a blower control value for the air conditioning load at the demanding time of the user into agreement with the demand of the user. Accordingly, hereafter in the condition of the same air conditioning load, the blower is controlled to meet an updated blower wind quantity on the basis of the modified data map.

FIG. 3, FIG. 4, FIG. 5, FIG. 6, FIG. 7, FIG. 8, FIG. 9, FIG. 10 and FIG. 11 are graphs illustrating the process of updating the control map of the air conditioning system for a vehicle according to the exemplary embodiment of the present invention, and the process of updating the data map will be described in detail referring to FIG. 3, FIG. 4, FIG. 5, FIG. 6, FIG. 7, FIG. 8, FIG. 9, FIG. 10 and FIG. 11.

When the demand value of the user for the specific portion is higher than the control value at the receiving time of the demand value, the update portion may update the control values belonging to an air conditioning load section before or after the air conditioning load at the receiving time such that the control values are increased to the demand value of the user. Conversely, when the demand value of the user for the specific portion is lower than the control value at the receiving time of the demand value, the update portion may update the control values belonging to an air conditioning load section before or after the air conditioning load at the receiving time such that the control values are decreased to the demand value of the user.

Figure 3:
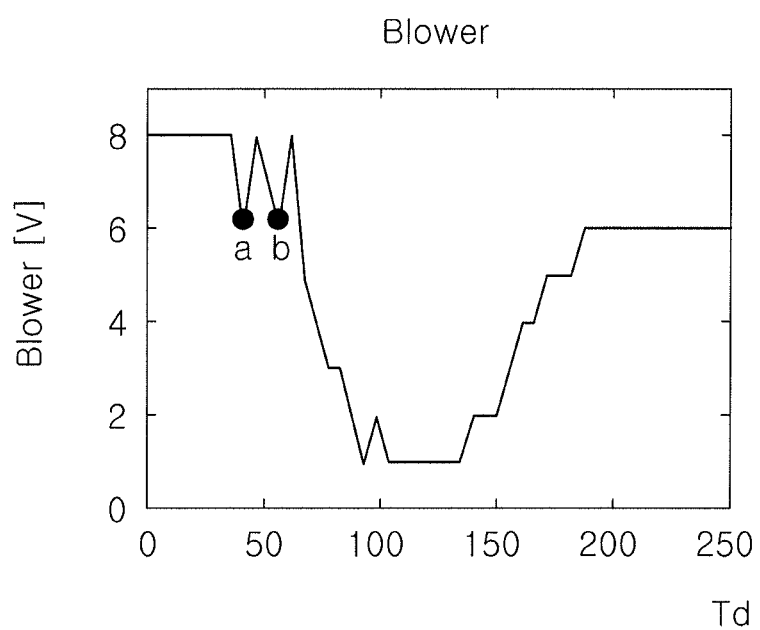
FIG. 3, FIG. 4, FIG. 5, FIG. 6, FIG. 7, FIG. 8, FIG. 9, FIG. 10 and FIG. 11 are graphs illustrating a process of updating a control map of the air conditioning system for a vehicle according to the exemplary embodiment of the present invention.
Figure 4:
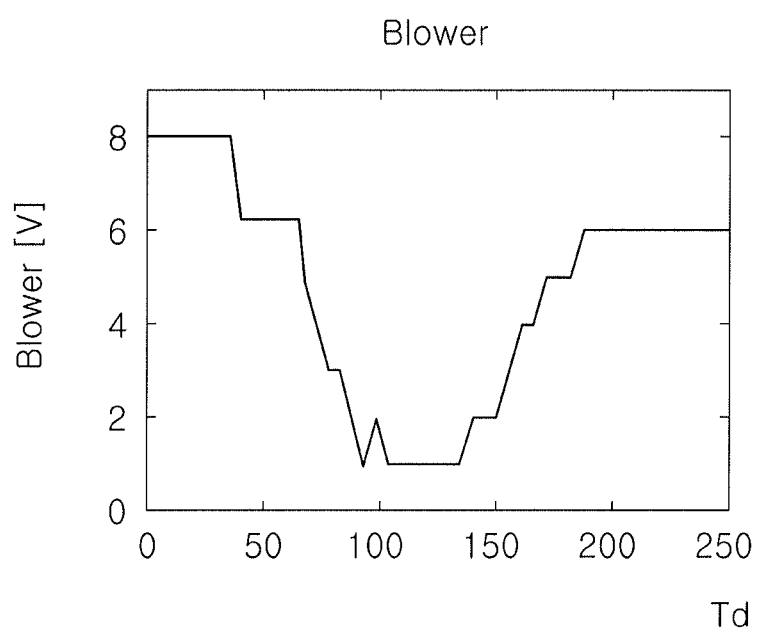

FIG. 3 and FIG. 4 are graphs updating the control map of the blower wind quantity. FIG. 3 is the graph of the control map before the updating and shows the control map controlling a voltage (V) of the blower according to the determined air conditioning load (Td). During control of the blower by the control map, when a user decreases manually the blower wind quantity at each of an a-point and a b-point, the update portion is configured to update the blower control map as shown in FIG. 4. That is, since a user demands to decrease a voltage of the blower from 8V to 6V, a demand value of the user for a specific portion is determined to be lower than a control value at the demanding time. Accordingly, control values belonging to an air conditioning load section of around 40 to 70 before or after the air conditioning load at the demanding time are updated to be decreased to 6V, which is the demand value of the user.

Figure 5:
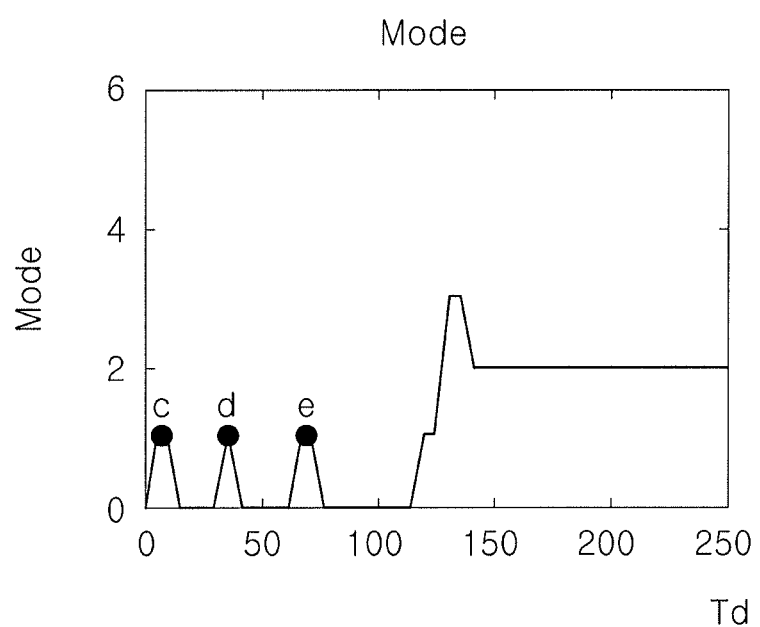
Figure 6:
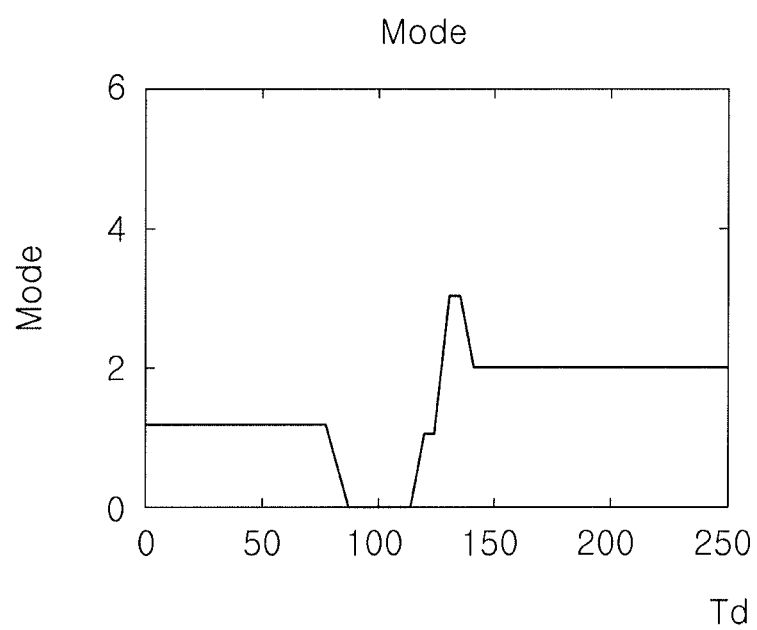

FIG. 5 and FIG. 6 are graphs updating the control map of the mode door. FIG. 5 is the graph of the control map before the updating and shows the control map controlling the mode door according to the determined air conditioning load (Td). As a reference, the mode door refers to a door controlling discharge of conditioned air in a floor direction, a middle direction, an upward direction, or a combined direction thereof according to an open degree of the door. During control of the mode door by the control map, when a user manually demands an air discharging direction not in "the middle direction" but in "middle and floor directions" at each of a c-point, a d-point, and an e-point, the update portion is configured to update the control map of the mode door as shown in FIG. 6. That is, when a user demands to increase the open degree of the mode door from 0 to 1, a demand value of the user for a specific portion is determined to be higher than a control value at the demanding time. Accordingly, control values of the open degree of the mode door belonging to an air conditioning load section of around 0 to 70 before or after the air conditioning load at the demanding time are updated to be increased to 1, which is the demand value of the user.

Figure 9:
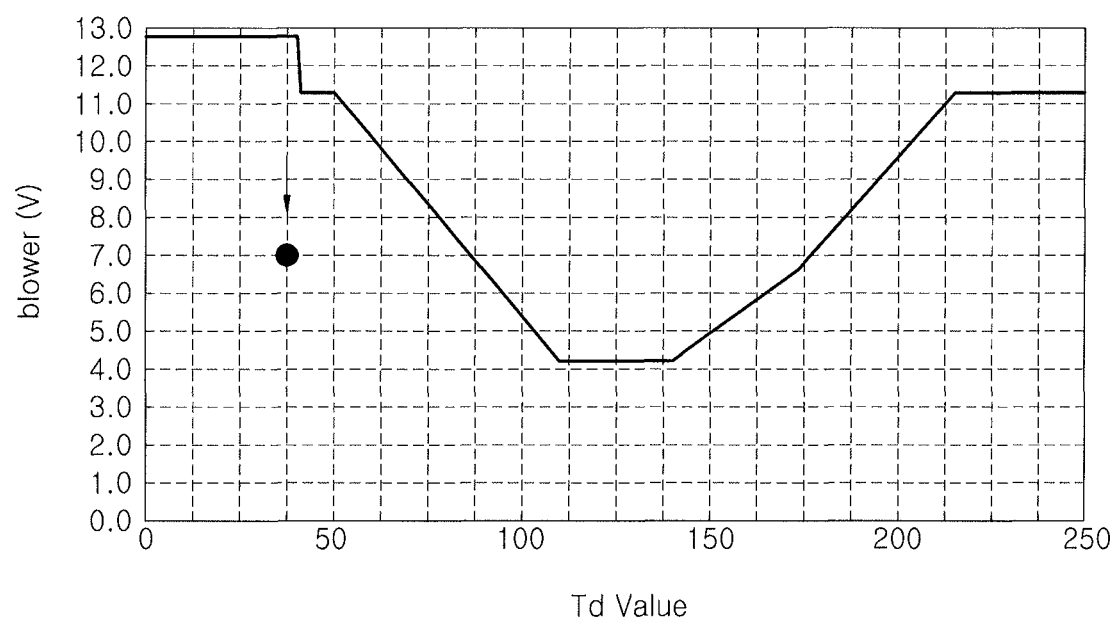
Figure 10:
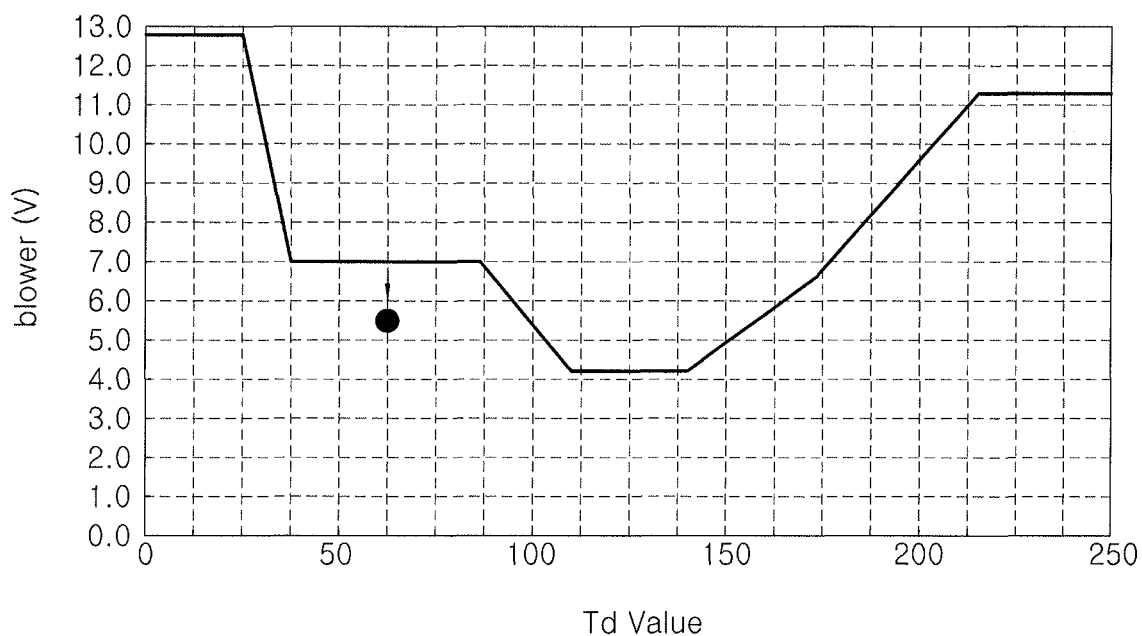
Figure 11:
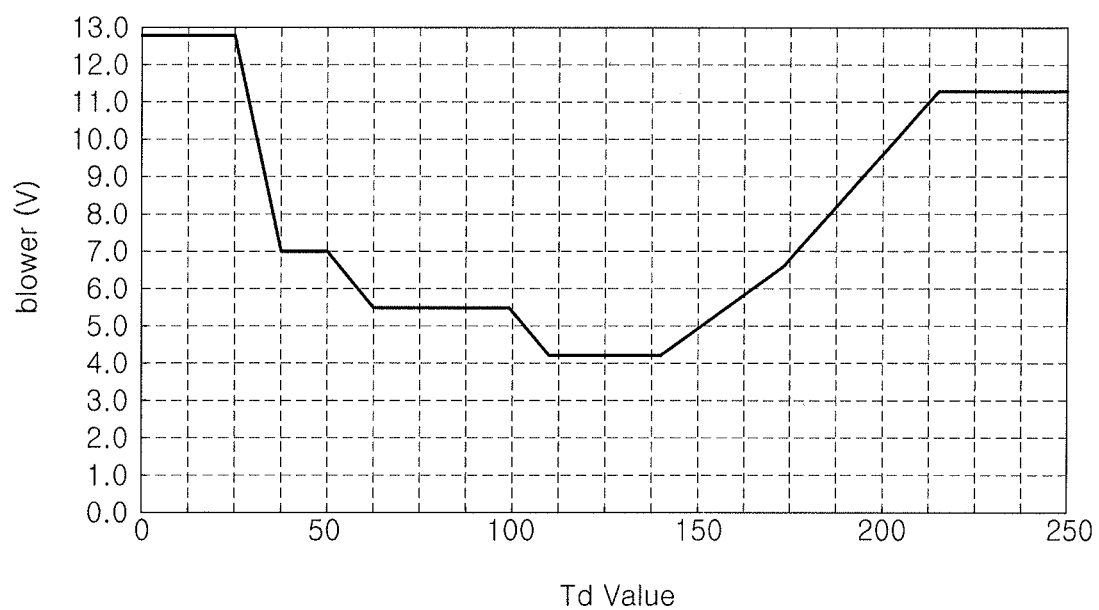

FIGS. 9 to 11 show other illustrations of updating the blower control map. FIG. 9 shows a state before the updating, and the air conditioning load is 40 in a present state, where the blower control value is controlled to be around 13V. In the present condition, when a user manually demands to lower the blower wind quantity (up to around 7V), the data map is updated as shown in FIG. 10. During the updating process, the blower control value is gradually decreased from the air conditioning load 30 prior to the air conditioning load 40 and becomes 7V, which is the demand value of the user, from the air conditioning load 40 at the demanding time of the user. Furthermore, the blower control value is updated to maintain 7V within a range from an air conditioning load prior to the updating to the air conditioning load of around 90, at which the blower control value becomes 7V, whereby blower control is performed stably without being excessive in value.

Next, as shown in FIG. 10, when a user further demands the blower control value of 5.5V at the air conditioning load of around 70, the control map is updated again as shown in FIG. 11.

Meanwhile, the load determination portion may determine the air conditioning load based on the external temperature of the vehicle. In the instant case, the storage portion may pre-store a predetermined temperature map, to which the air conditioning load is input and from which a predetermined temperature value is output. The update portion may update the predetermined temperature value for the air conditioning load pre-stored in the control map to a predetermined temperature demand value of a user when receiving the predetermined temperature demand value of the user. That is, in the auto mode, a user inputs a predetermined temperature, and the air conditioning actuator is automatically controlled to meet the predetermined temperature. In a certain external temperature (extremely cold or hot), a user sets a predetermined temperature to a temperature different from a temperature of 23° C. to 24° C., which is a frequently-used temperature. This is also intended to automatically change a predetermined temperature. To the present end, in the controller, when a user changes a predetermined temperature, an external temperature at the changing time is detected and a control value of the predetermined temperature corresponding to the external temperature is changed. Accordingly, when the external temperature is detected hereafter, the predetermined temperature map is updated to automatically change a predetermined temperature.

Figure 7:
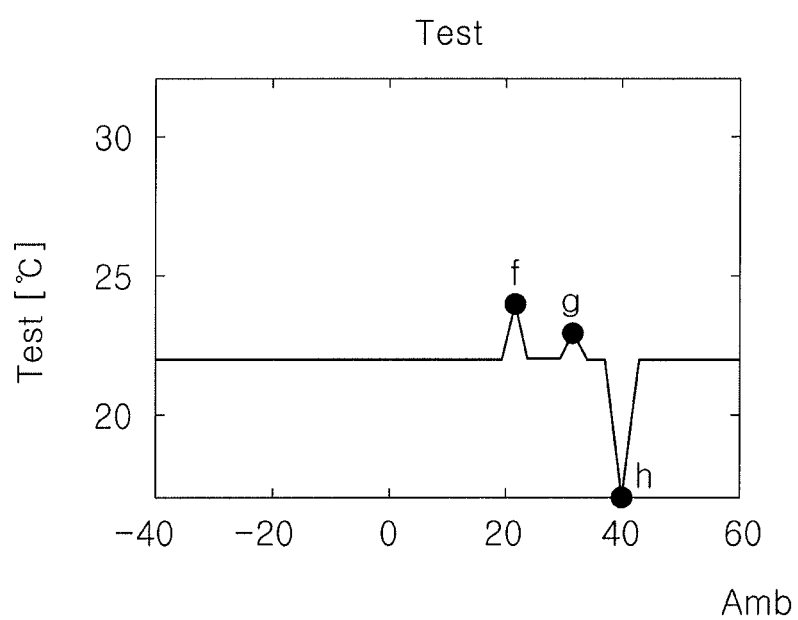
Figure 8:
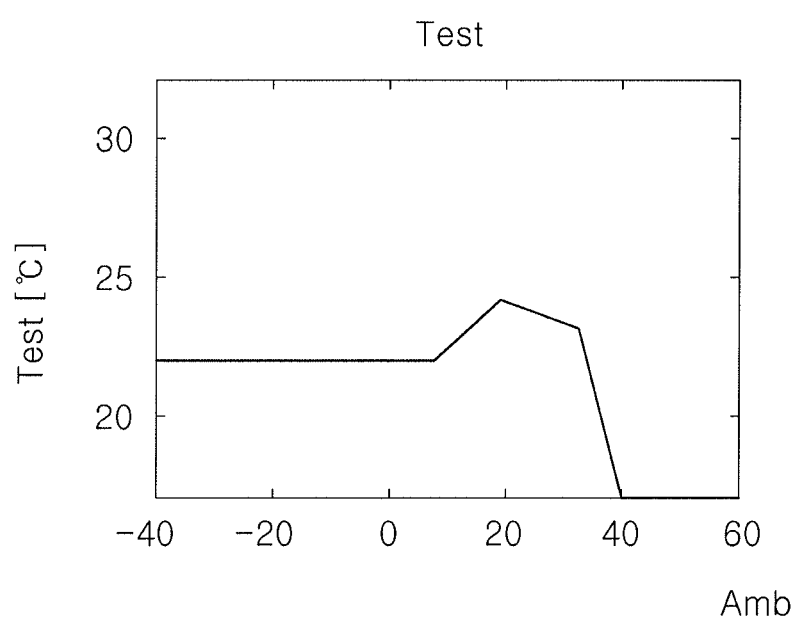

FIG. 7 shows an occasion in which a user increases and decreases a predetermined temperature at each of an f-point, a g-point, and an h-point in the pre-stored predetermined temperature map. In the instant case, the predetermined temperature map is updated as shown in FIG. 8.

Furthermore, in the above-mentioned method, a refrigerant compressor on/off may be controlled. The storage portion may store a cooling device control map, to which the air conditioning load is input and from which a control value of a cooling device (for example, a refrigerant compressor) is output, and the update portion may update the cooling device control value for the air conditioning load pre-stored in the control map to a cooling device demand value of a user when receiving the cooling device demand value of the user. That is, as for an external temperature indefinite to determine whether to turn on an air conditioner, such as in the spring or fall, whether to turn on the air conditioner at a predetermined temperature depends on a user. In the instant case, various aspects of the present invention are directed to providing a customized air conditioning control by additionally updating the cooling device control map.

Meanwhile, apart from the internal temperature and the external temperature, the load determination portion may determine the air conditioning load by use of various data such as a solar radiation amount, an evaporator temperature, a coolant temperature, humidity, and vehicle speed.

Meanwhile, FIG. 2 is the flowchart of the control method of the air conditioning system for a vehicle according to the exemplary embodiment of the present invention. The control method of the air conditioning system for a vehicle of the present invention includes: determining the air conditioning load, by the load determination portion, based on the factors including the internal temperature or the external temperature of the vehicle detected by the temperature detector; receiving the demand value of the user, by the controller, for the air conditioning actuator; and updating, by the controller, the control value of the air conditioning actuator for the air conditioning load pre-stored in the control map to the demand value of the user.

First, it is determined whether the air conditioning system operates in the auto mode at S100. When the air conditioning system operates in the auto mode, the air conditioning system allows the air conditioning load to be determined at S200. Next, the air conditioning load is put into the control map to obtain the control value at S220. Accordingly, the air conditioning actuator is controlled at S240. In the instant case, when a user manually inputs a specific demand value at S300, it is determined whether an air conditioning state is normal at S320.

When the air conditioning state is normal, the control map is updated based on the demand value of the user as described above at S400. As a reference, a normal air conditioning state refers to a state in which the internal temperature approaches the predetermined temperature and is maintained to the predetermined temperature steadily for a predetermined hour or more.

In an exemplary embodiment of the present invention, the normal air conditioning state refers to a state in which the internal temperature is in a predetermined range of temperature and is maintained in the predetermined range of temperature steadily for a predetermined hour or more.

According to the air conditioning system for a vehicle and the control method of the present invention, user manipulation of the air conditioning system received on the basis of calories or other required conditions necessary for air conditioning of a vehicle is learned, and a learning result is applied to the control map of the air conditioning system to provide the customized air conditioning control.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An air conditioning system for a vehicle, the air conditioning system comprising:
   a temperature detector;
   an air conditioning actuator including a cooling device and a blower; and
   a controller connected to the temperature detector and the air conditioning actuator, wherein the controller includes:
      a load determination portion determining an air conditioning load based on factors including a value of an internal temperature or a value of an external temperature of a vehicle detected by the temperature detector;
      a storage portion storing a control map that controls the air conditioning actuator according to the air conditioning load; and
      an update portion updating a control value, pre-stored in the control map, of the air conditioning actuator for the air conditioning load to a demand value of a user when receiving the demand value of the user for the air conditioning actuator.

2. The air conditioning system of claim 1, further including a switch connected to the update portion, wherein the update portion receives the demand value of the user for the air conditioning actuator by the switch.

3. The air conditioning system of claim 1,
   wherein the temperature detector is configured to detect the internal temperature and the external temperature of the vehicle, and
   wherein the load determination portion is configured to determine the air conditioning load based on the values of the internal temperature and the external temperature of the vehicle.

4. The air conditioning system of claim 3,
   wherein the air conditioning load is a caloric index, and the load determination portion is configured to determine the caloric index by use of difference between a predetermined temperature value input by the user and a predetermined reference value, difference between the predetermined temperature value and the value of the internal temperature, the value of the external temperature value, and solar radiation amount level.

5. The air conditioning system of claim 1, wherein the control map of the storage portion is a data map, to which the air conditioning load is input and from which blower wind quantity and a time when to operate the cooling device are output.

6. The air conditioning system of claim 1, wherein the air conditioning actuator further includes a mode door controlling an internal discharging direction of air.

7. The air conditioning system of claim 1, wherein when receiving the demand value of the user for a predetermined part of the air conditioning actuator, the update portion is configured to update a control value for the air conditioning load of control values for the predetermined part pre-stored in the control map to the demand value of the user.

8. The air conditioning system of claim 7,
   wherein when the demand value of the user for the predetermined part is higher than the control values at a receiving time of the demand value, the update portion is configured to update the control value belonging to an air conditioning load section before or after the air conditioning load at the receiving time such that the control values are increased to the demand value of the user.

9. The air conditioning system of claim 7,
   wherein when the demand value of the user for the predetermined part is lower than the control value at the receiving time of the demand value, the update portion is configured to update the control values belonging to an air conditioning load section before or after the air conditioning load at the receiving time such that the control values are decreased to the demand value of the user.

10. The air conditioning system of claim 1,
    wherein the load determination portion is configured to determine the air conditioning load based on the external temperature of the vehicle.

11. The air conditioning system of claim 10,
    wherein the storage portion stores a predetermined temperature map, to which the air conditioning load is input and from which a predetermined temperature value is output, and
    wherein the update portion is configured to update the predetermined temperature value for the air conditioning load pre-stored in the control map to a predetermined temperature demand value of the user when receiving the predetermined temperature demand value of the user.

12. The air conditioning system of claim 10,
    wherein the storage portion stores a cooling device control map, to which the air conditioning load is input and from which a cooling device control value is output, and
    wherein the update portion is configured to update the cooling device control value for the air conditioning load pre-stored in the control map to a cooling device demand value of the user when receiving the cooling device demand value of the user.

13. A control method of the air conditioning system of claim 1, the control method comprising:
    determining the air conditioning load, by the load determination portion, based on the factors including the internal temperature or the external temperature of the vehicle detected by the temperature detector;
    receiving the demand value of the user, by the controller, for the air conditioning actuator; and
    updating, by the controller, the control value of the air conditioning actuator for the air conditioning load pre-stored in the control map to the demand value of the user.

14. The control method of the air conditioning system of claim 13,
    wherein the updating, by the controller, the control value of the air conditioning actuator for the air conditioning load pre-stored in the control map to the demand value of the user, is performed when the internal temperature approaches a predetermined temperature and is maintained to the predetermined temperature steadily for a predetermined time period.

15. The control method of the air conditioning system of claim 13,
wherein the updating, by the controller, the control value of the air conditioning actuator for the air conditioning load pre-stored in the control map to the demand value of the user, is performed when the internal temperature is in a predetermined range of temperature and is maintained in the predetermined range of temperature steadily for a predetermined time period.

* * * * *